US011955887B2

(12) United States Patent
Lee et al.

(10) Patent No.: US 11,955,887 B2
(45) Date of Patent: Apr. 9, 2024

(54) POWER SUPPLY CONTROL WITH INDUCTOR CURRENT CONTROL AND METHOD THEREOF

(71) Applicant: Magnachip Semiconductor, Ltd., Cheongju-si (KR)

(72) Inventors: Jang Hyuck Lee, Seongnam-si (KR); Joo Han Yoon, Seongnam-si (KR); Byoung Kwon An, Seoul (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 103 days.

(21) Appl. No.: 17/546,512

(22) Filed: Dec. 9, 2021

(65) Prior Publication Data
US 2022/0345041 A1    Oct. 27, 2022

(30) Foreign Application Priority Data

Apr. 23, 2021   (KR) .......................... 10-2021-0053180

(51) Int. Cl.
| | | |
|---|---|---|
| *H02M 3/156* | (2006.01) | |
| *H02M 1/00* | (2006.01) | |
| *H02M 3/158* | (2006.01) | |
| *H05B 45/375* | (2020.01) | |

(52) U.S. Cl.
CPC ......... *H02M 3/156* (2013.01); *H02M 1/0009* (2021.05); *H02M 1/0058* (2021.05); *H02M 3/158* (2013.01); *H05B 45/375* (2020.01)

(58) Field of Classification Search
CPC .... H02M 3/156; H02M 3/158; H02M 1/0009; H02M 1/0058; H05B 45/38
See application file for complete search history.

(56) References Cited

U.S. PATENT DOCUMENTS

| | | | |
|---|---|---|---|
| 10,651,727 B2 | 5/2020 | Imanaka | |
| 2016/0126848 A1* | 5/2016 | Sasaki | H02M 1/32 363/21.13 |
| 2016/0360582 A1* | 12/2016 | Kato | H02M 1/32 |
| 2016/0360583 A1* | 12/2016 | Kato | H02M 3/156 |
| 2019/0229635 A1* | 7/2019 | Hyugaji | G01R 19/155 |

\* cited by examiner

*Primary Examiner* — Alex Torres-Rivera
(74) *Attorney, Agent, or Firm* — NSIP Law

(57) ABSTRACT

A switch control circuit and a switch control method are provided. In this circuit, compositions that sense a drain voltage of a switch device are added in a QR Buck Converter switch control circuit. A first resistor, a second switch, a second resistor are electrically connected to a drain terminal of a switch device to sense the 0 A state of an inductor current. On the basis of a detection result, the switch control circuit turns on the switch device when an inductor current is 0 A, and a drain sensing voltage (ZCD) is less than a predetermined reference voltage (REF).

17 Claims, 8 Drawing Sheets

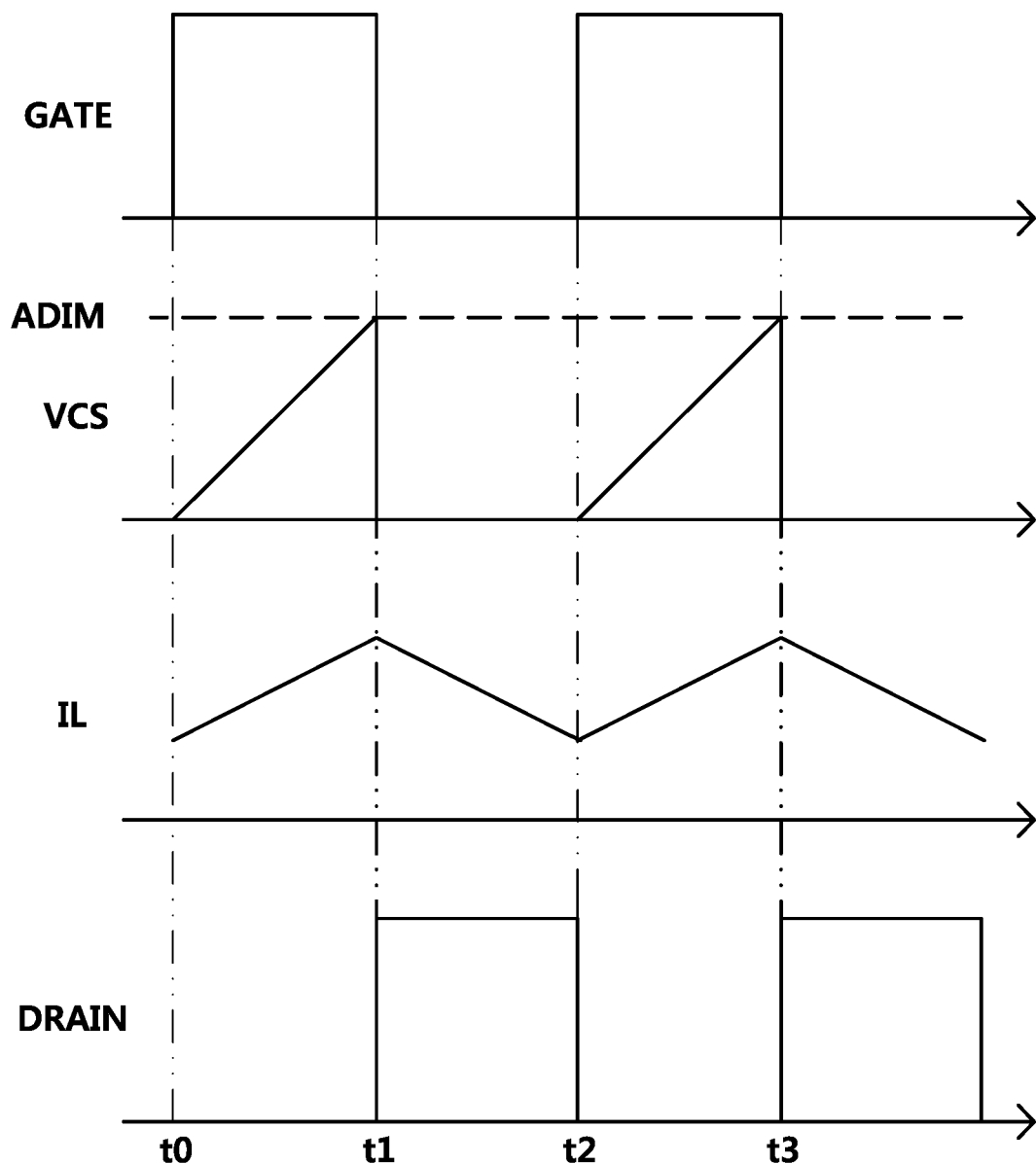

POWER SUPPLY CONTROL WITH INDUCTOR CURRENT CONTROL AND METHOD THEREOF

CROSS-REFERENCE TO RELATED APPLICATIONS

This application claims the benefit under 35 U.S.C. 119(a) of Korean Patent Application No. 10-2021-0053180 filed on Apr. 23, 2021, in the Korean Intellectual Property Office, the entire disclosure of which is incorporated herein by reference for all purposes.

BACKGROUND

1. Field

The following disclosure relates to a switch control circuit and a switch control method.

2. Description of Related Art

A switch control circuit may be operated through a switch converter method by implementing, as an example, a 'Constant Current Mode Buck Converter' or a 'Quasi-Resonant Buck Converter'. A switch control circuit operated by this method may be implemented with a structure that includes a switching device such as a metal-oxide-semiconductor field-effect-transistor (MOSFET), and etc. A switch control circuit including the MOSFET may full-wave rectify alternating current power, sense a full-wave rectified voltage level, and selectively apply a full-wave voltage to a target circuit such as a display circuit, according to the sensed voltage level.

However, in a typical switch control circuit, switching loss of a MOSFET may be an issue. In the example of a switch control circuit, when an inductor current is 0 A (Zero ampere) switching loss of MOSFET may be removable if a gate terminal is in a high state. In a typical composition, however, a gate terminal may be in a high state before an inductor current is 0 A. Accordingly switching loss of a MOSFET may not be removed. Moreover, this type of switching loss increases the temperature of a MOSFET device, thus making switching operations difficult at a certain frequency, such as 150 kHz, or higher. Therefore, the performance of an apparatus with a switch control circuit may decline.

Additionally, in a typical circuit composition, a current may be consumed even when a switch control circuit is not operated, and a loss may occur by propagation delay due to a capacitor sensing drain voltage.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In a general aspect, a switch control circuit includes a load, an inductor, a first switch, and a sensing resistor connected in series with an input power source terminal; a sensing circuit, configured to sense when current flowing through the inductor is equal to 0 A (Zero ampere); a first comparator, configured to compare a sensing voltage with a load current setting voltage; a second comparator, configured to compare a drain sensing voltage with a predetermined reference voltage; and a switch operating unit, configured to control the first switch based on an output signal of the first comparator and an output signal of the second comparator, wherein the second comparator is configured to apply an output signal to the switch operating unit to turn on the first switch when the drain sensing voltage is less than the predetermined reference voltage.

The sensing voltage may be a voltage across both sides of the sensing resistor.

The drain sensing voltage may sense a drain voltage of the first switch.

The sensing circuit may include a first resistor, a second switch, and a second resistor connected in series between a drain terminal of the first switch and a ground terminal.

The first switch and the second switch may each be implemented as a metal-oxide-semiconductor field-effect-transistor (MOSFET).

The switch control circuit may be further configured to be implemented as a Quasi Resonant Buck Converter.

The sensing of the drain voltage in the first switch may be performed between the second switch and the second resistor of the sensing circuit.

In a general aspect, a Quasi-Resonant Mode Buck Converter switch control method includes sensing a decrease of an inductor current when a gate terminal of a first switch is in a low state; comparing a drain sensing voltage of the first switch with a predetermined reference voltage when the inductor current has a value of 0 A; and outputting a control signal to place the gate terminal in a high state when the drain sensing voltage is less than the predetermined reference voltage.

The gate terminal may be in a low state when a sensing voltage across both sides of a sensing resistor and a load current setting voltage are equal.

A power supply device includes a switch control circuit; and a load, an inductor, and a first switch, each connected in series with an input power source terminal, wherein the switch control circuit includes: a sensing circuit comprising a first resistor, a second switch, and a second resistor connected to a drain terminal of the first switch, and configured to sense a drain voltage of the first switch; and a controller, configured to determine a turn-on timing of the first switch based on a drain sensing voltage detected by the sensing circuit.

The sensing of the drain voltage of the first switch may be performed between the second switch and the second resistor of the sensing circuit.

A first side of a sensing resistor may be connected in series with a source terminal of the first switch, and a second side of the sensing resistor is connected to a ground terminal.

The first switch and the second switch may each be implemented as a metal-oxide-semiconductor field-effect-transistor (MOSFET).

The controller may be configured to determine a turn-off timing of the first switch based on a sensing voltage between the source terminal of the first switch and the sensing resistor.

The switch control circuit may further include a first comparator, configured to output a signal to determine a turn-off timing of the first switch by comparing a sensing voltage of a source terminal of the first switch with a load current setting voltage.

The switch control circuit may further include a second comparator configured to output a signal to determine a turn-on timing of the first switch by comparing the drain sensing voltage with a predetermined reference voltage.

The device may include a switch operating unit, configured to control a turn-on operation or a turn-off operation of the first switch, based on an output signal of the first comparator or an output signal of the second comparator.

The second comparator may be configured to apply an output signal to the switch operating unit to turn on the first switch when the drain sensing voltage, which decreases when an inductor current is 0 A, is less than the predetermined reference voltage.

Other features and aspects will be apparent from the following detailed description, the drawings, and the claims.

BRIEF DESCRIPTION OF DRAWINGS

FIG. 2A and FIG. 2B illustrate example operation timing diagrams of FIG. 1.

Throughout the drawings and the detailed description, the same reference numerals refer to the same elements. The drawings may not be to scale, and their relative sizes, proportions, and depictions of elements may be exaggerated for clarity, illustration, and convenience.

DETAILED DESCRIPTION

Figure 1:
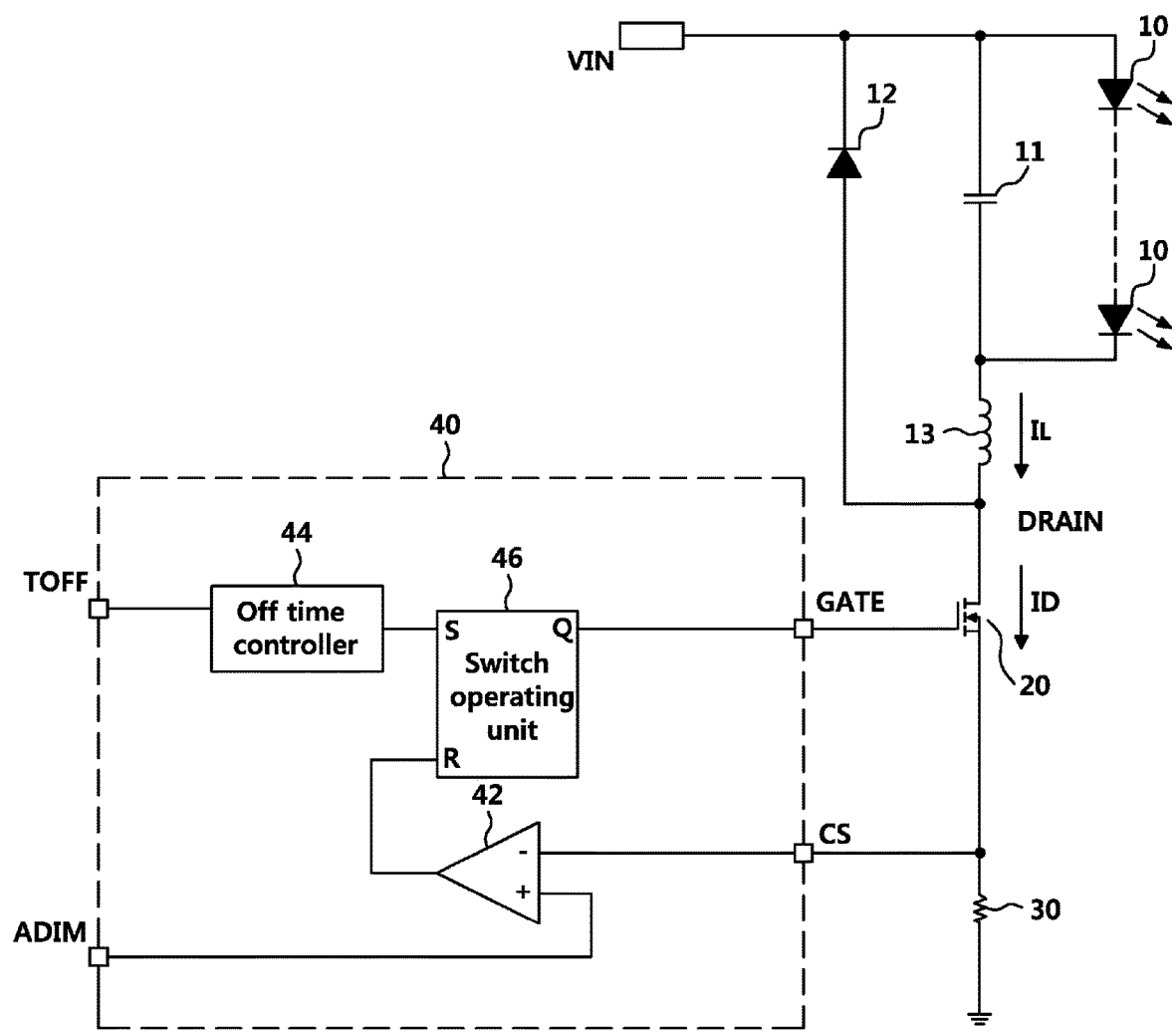
FIG. 1 illustrates an example Buck Converter circuit in normal Constant Current Mode.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of the application, may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include varies in shape that occur during manufacturing.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

The features of the examples described herein may be combined in various ways, as will be apparent after an understanding of the disclosure of this application. Further, although the examples described herein have a variety of configurations, other configurations are possible, as will be apparent after an understanding of the disclosure of this application.

The disclosure may provide a switch control circuit and a switch control method thereof that may remove a switching loss by making a gate terminal high when an inductor current becomes 0 A.

The disclosure also may provide a switch control circuit and a switch control method thereof that may enable switching operation over a certain frequency.

The disclosure also may provide a switch control circuit and a switch control method thereof that may minimize a consumed current by blocking a flow of current when a circuit is not operated.

The following description explains details of the disclosure based on embodiments described in the drawings. Before describing the disclosure, a typical switch control circuit that may be compared with a switch control circuit of the disclosure will first be delineated.

The example switch control circuit and switch control method may prevent a switching loss.

Figure 2B:
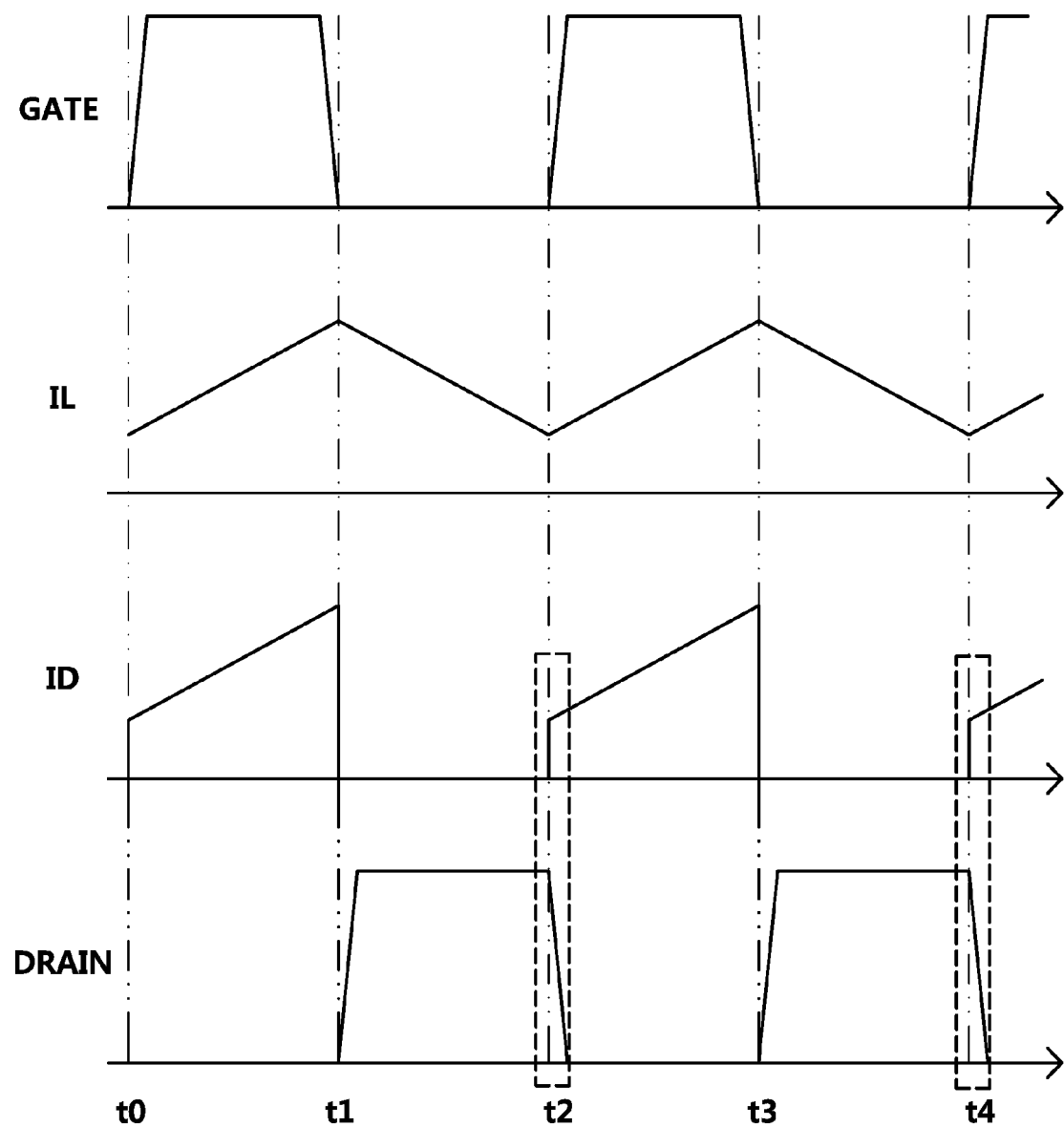

FIG. 1 illustrates an example Buck Converter circuit in a normal Constant Current Mode and FIG. 2A and FIG. 2B illustrate example operation timing diagrams. In the example circuit diagram illustrated in FIG. 1, light-emitting devices 10 are connected in series to an input power source terminal (VIN).

Referring to FIG. 1, a capacitor 11 may be connected in parallel with the light-emitting devices 10 and a diode 12 that rectifies a current inputted in the light-emitting devices 10 and the capacitor 11. An inductor 13, that is connected in series with the light-emitting devices 10 and the capacitor 11 may be included. The light-emitting devices 10 and the capacitor 11 may be referred to as a load. A control switch 20 and a sensing resistor 30 may be connected between the inductor 13 and a ground terminal. In a non-limiting example, the control switch 20 may be embodied as a MOSFET.

In an example, a switch controller 40 may be provided for turn-on/turn-off operations of the control switch 20. The switch controller 40 may compare a CS voltage of the sensing resistor 30 with a predetermined analog dimming (ADIM) voltage, and output a control signal that enables turn-on/turn-off operations of the control switch 20.

Referring to FIG. 1, the CS voltage is a voltage on both sides of the sensing resistor 30 that is connected in series with the control switch 20, or a voltage connected to a CS terminal. ADIM voltage is a voltage set to control the light-emitting devices 10. The switch controller 40 may include a comparator 42 that compares a CS voltage with an ADIM voltage, an off-time controller 44, and a switch operating unit or circuit 46 (SR latch) that controls the control switch 20 according to an output of the comparator 42 and the off-time controller 44.

An operation timing diagram of FIG. 2A illustrates an ideal operation of the Buck Converter. When a gate terminal (GATE) of the control switch 20 is in a high state (t0) based on an output of the switch controller 40, the control switch 20 is configured to turned on. Then, as an inductor current (IL) increases, a drain current flows through the control switch 20. An increase of a drain current may mean an increase of a CS voltage.

A gate terminal (GATE) may be in a low state when the CS voltage increases and reaches a predetermined ADIM voltage. When the gate terminal (GATE) is in a low state, the inductor 13 may begin to discharge, and the inductor current IL may be fed back through the diode 12. At this point, since the control switch 20 is turned off, a drain voltage (DRAIN) is in a high state (t1). A high state is maintained for a predetermined period until the off-time controller 44 generates and outputs a SET signal to SR latch 46. When the gate terminal (GATE) is in a high state again, the aforementioned operation is repeated.

However, since a switching loss may occur in a Buck Converter of FIG. 1 during a switching operation of the control switch 20, the waveforms of the gate terminal and the drain voltage may operate with a determined slope, as illustrated in FIG. 2B. In this example, a drain voltage may begin to discharge at a section where a drain current (ID) abruptly increases, which is where a switching loss may occur. This is illustrated as a dotted-lined at t2 and t4 in FIG. 2B.

Figure 3:
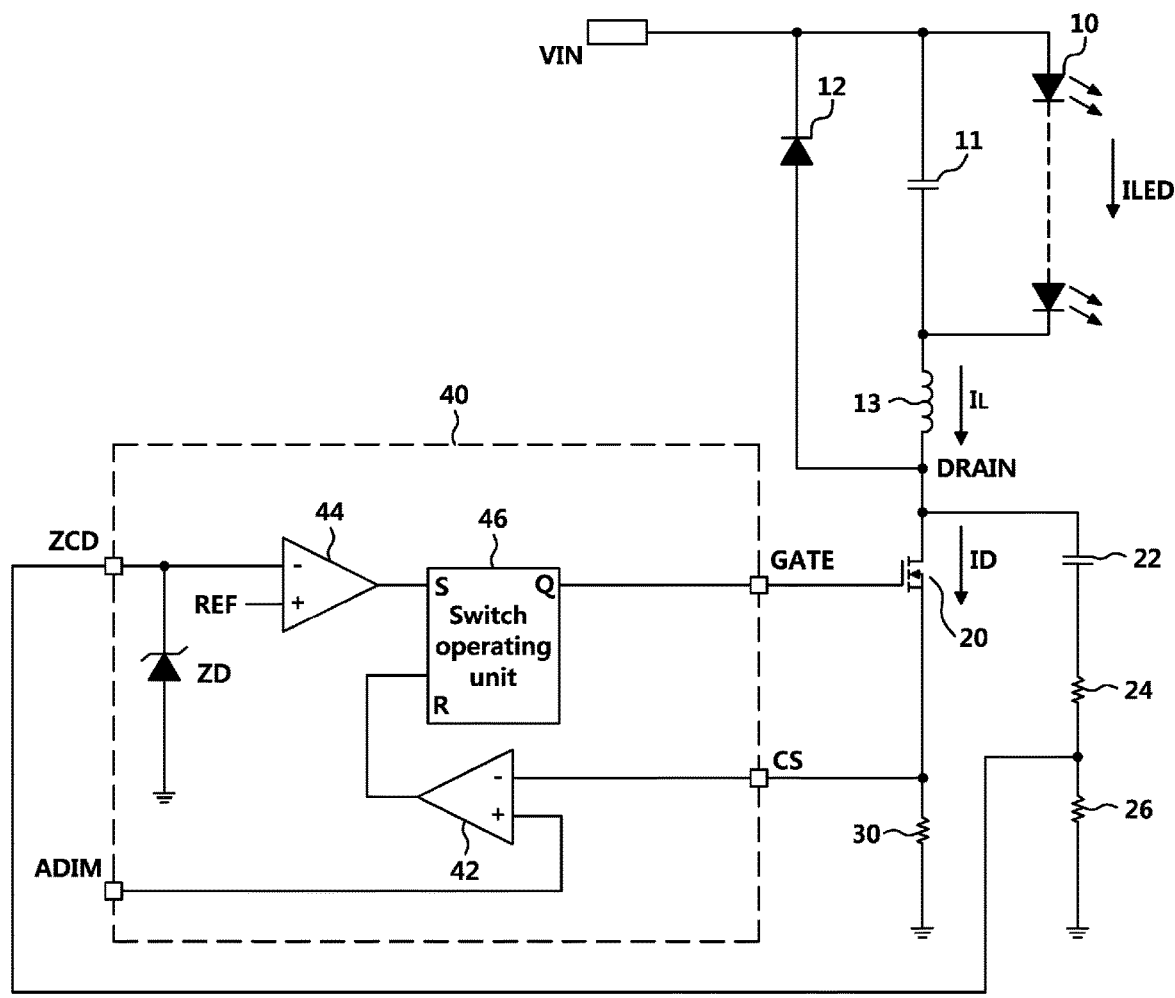
FIG. 3 illustrates an example Buck Converter circuit in normal Quasi-Resonant Mode.
Figure 4:
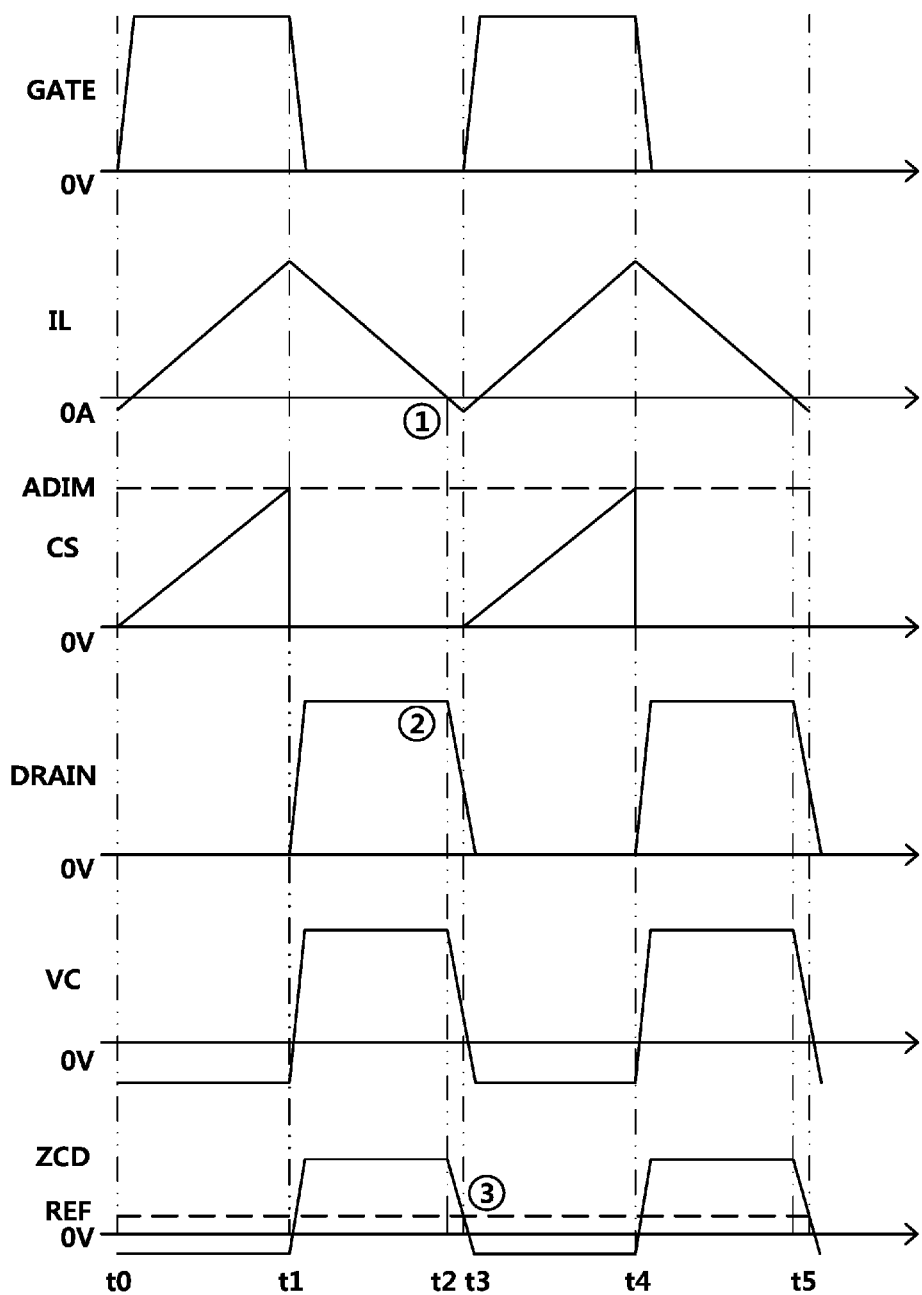
FIG. 4 illustrates an example operation timing diagram of FIG. 3.

FIG. 3 illustrates an example Buck Converter circuit in a normal Quasi-Resonant mode, and FIG. 4 illustrates an example operation timing diagram of FIG. 3.

Referring to FIG. 3. compared to the example switch control circuit operating in a Constant Current Mode (CCM) of FIG. 1, the Buck Converter circuit in a normal Quasi-Resonant mode as illustrated in FIG. 3 may include a capacitor 22, which is connected in series with a first resistor 24, and a second resistor 26. The capacitor 22, the first resistor 24 and the second resistor 26 are added to sense a drain voltage of the control switch 20. In the switch controller 40, a first comparator 42 that compares a CS voltage with an ADIM voltage, a second comparator 44 that compares a drain sensing voltage (ZDC) with a predetermined reference voltage (REF), and a switch operating unit 46 that outputs a control signal to the control switch 20 according to an output of the first comparator 42 and the second comparator 44 may be included. The switch operating unit 46 may be an SR latch, but is not limited thereto.

Referring to the timing diagram of FIG. 4, in the circuit of the Quasi-Resonant mode of FIG. 3, a drain voltage (DRAIN) starts to decrease (②) when an inductor current (IL) becomes 0 A (①). When a drain sensing voltage (ZCD) falls below a predetermined reference voltage (REF) (③), a gate terminal (GATE) may become a high state based on an output of the switch controller 40. A point when the gate terminal (GATE) becomes a high state is when the drain voltage (DRAIN) is 0V. Accordingly, a switching loss of a control switch 20 may be reduced.

However, in the Quasi-Resonant Mode circuit of FIG. 3, a propagation delay may occur based on the capacitor device 22 when a drain voltage sensed by a drain side of the control switch 20 is delivered to a second comparator 44 of the switch controller 40. Thus, a switching loss caused by the propagation delay could not be removed fully even in a Quasi-Resonant mode circuit.

The examples may solve the problems caused by the typical circuit composition explained above.

Figure 5:
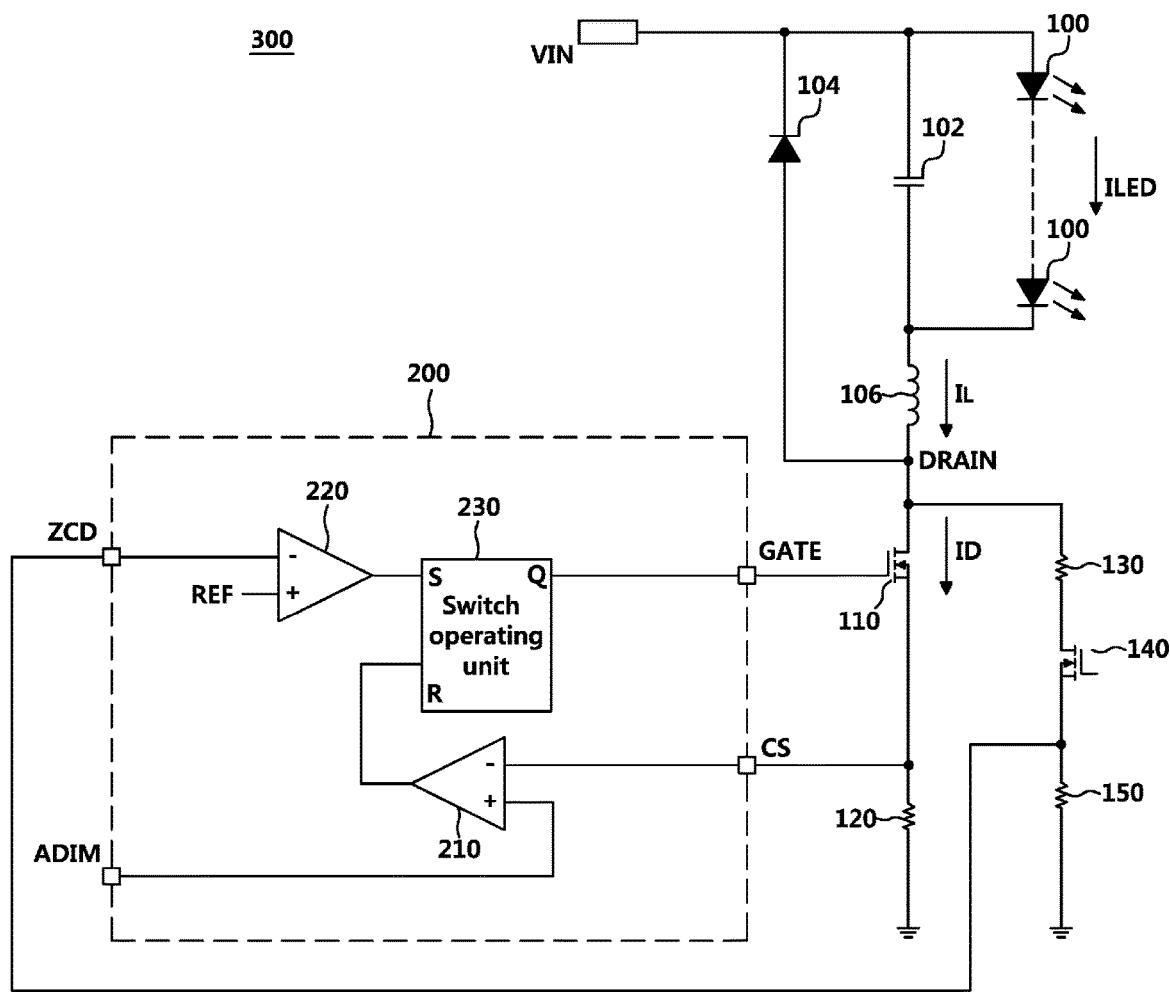
FIG. 5 illustrates an example switch control circuit, in accordance with one or more embodiments.

FIG. 5 illustrates an example switch control circuit, in accordance with one or more embodiments.

With reference to FIG. 5, a switch control circuit 300 may include at least one light-emitting device 100, or a plurality of series connected light-emitting devices 100, connected to an input power source terminal (VIN). A light-emitting device 100, or plurality of light-emitting devices 100, may be the same device that is operated when a current is supplied, such as LED, etc., and light-emitting devices 100 may be connected in series. However, this is only an example, and other devices may be applied instead of LEDs, and the examples are not limited to a specific device. In the examples, a light-emitting device 100 may be a target circuit that emits light by operating the switch control circuit 300.

The switch control circuit 300 in accordance with one or more embodiments, may include a capacitor 102 and a diode 104 connected in parallel with the light-emitting device or devices 100. The diode 104 may be configured to rectify a current inputted in the light-emitting device 100 and the capacitor 102. The switch control circuit 300 may include an inductor 106 that is connected in series with the light emitting device or devices 100 and the capacitor 102. The light emitting device or devices 100 and the capacitor 102 may be referred to as a load. An inductor current (IL) may be fed back through the diode 104, or may be delivered to a first switch 110, which will be described later.

The first switch 110 may be connected to the inductor 106 to control the inductor current (IL). The first switch 110 may be a first MOSFET connected in series with the inductor 106. The first switch 110 may control the inductor current (IL) that flows through the inductor 106, according to a control signal of a controller 200. That is, when the first switch 110 is configured to turn on, the inductor current (IL) or a drain current (ID) flows based on power output from an input power source terminal (VIN). Additionally, when the first switch 110 is configured to turn off, a driving current (ILED) is provided to the light-emitting device or devices 100 as a current charged in the inductor 106 is discharged.

A sensing resistor 120 may be connected to the first switch 110. The sensing resistor 120 may be connected between a source terminal of the first switch 110 and a ground terminal. Based on a voltage across both sides of the sensing resistor 120 (or CS terminal), a current that flows through a light-emitting device 100 may be measured.

The examples provide a circuit composition to remove a switching loss. A switching loss may be removed by setting a gate terminal to a high state when an inductor current is 0 A. Thus, a composition that senses a point when an inductor current becomes 0 A (IL=0 A) is desired. Accordingly, the switch control circuit 300 may provide a composition where a first resistor 130, a second switch 140, and a second resistor 150 are sequentially connected between the drain terminal of the first switch 110 and another ground terminal. That is, the first resistor 130, the second switch 140, and the second resistor 150 may be added to sense a drain voltage of the first switch 110. Compared to the typical circuits illustrated in FIG. 1 and FIG. 3, the configuration as illustrated in FIG. 5 is different. More specifically, compared with the Quasi-Resonant mode circuit of FIG. 3, a second switch 140, which is a switch device, is added and the capacitor 22 is removed. Thus, by removing the capacitor 22, a drain voltage (DRAIN) may be sensed without delay.

The first resistor 130 and the second resistor 150 may lower a drain voltage at a predetermined rate. The first resistor 130 and the second resistor 150 may be configured to distribute the drain voltage.

In an example, the second switch 140 may provide two functions. First, the second switch 140 may prevent a drain voltage from increasing over a certain voltage. Second, the second switch 140 may prevent a current applied from an input power source terminal (VIN) from flowing to the first resistor 130 and the second resistor 150 through the one or more light-emitting devices 100, which may occur because the second switch 140 may turn off when the switch control circuit 300 is not being operated. Thus, if the second switch 140 is configured to turn off, it is possible to prevent a loss of unnecessary current consumption when the switch control circuit 300 is not being operated. On the other hand, when the switch control circuit 300 is being operated, the second switch 140 operates in a turn-on state.

Referring again to FIG. 5, the switch control circuit 300 may include a controller 200 that operates the first switch 110 by outputting a control signal. The controller 200 may include a first comparator 210 that compares a sensing voltage (CS) with a predetermined ADIM voltage (a voltage that is set to control the light-emitting device(s). The Analog Dimming voltage (ADIM), may hereinafter be referred to as a load current setting voltage); a second comparator 220 that compares a predetermined reference voltage REF with a drain sensing voltage (ZDC voltage) (a voltage that senses a voltage of a drain terminal); and a switch operating unit or circuit 230 (SR latch) that outputs a control signal to the first switch 110 based on an output of the first comparator 210 and the second comparator 220.

Figure 6:
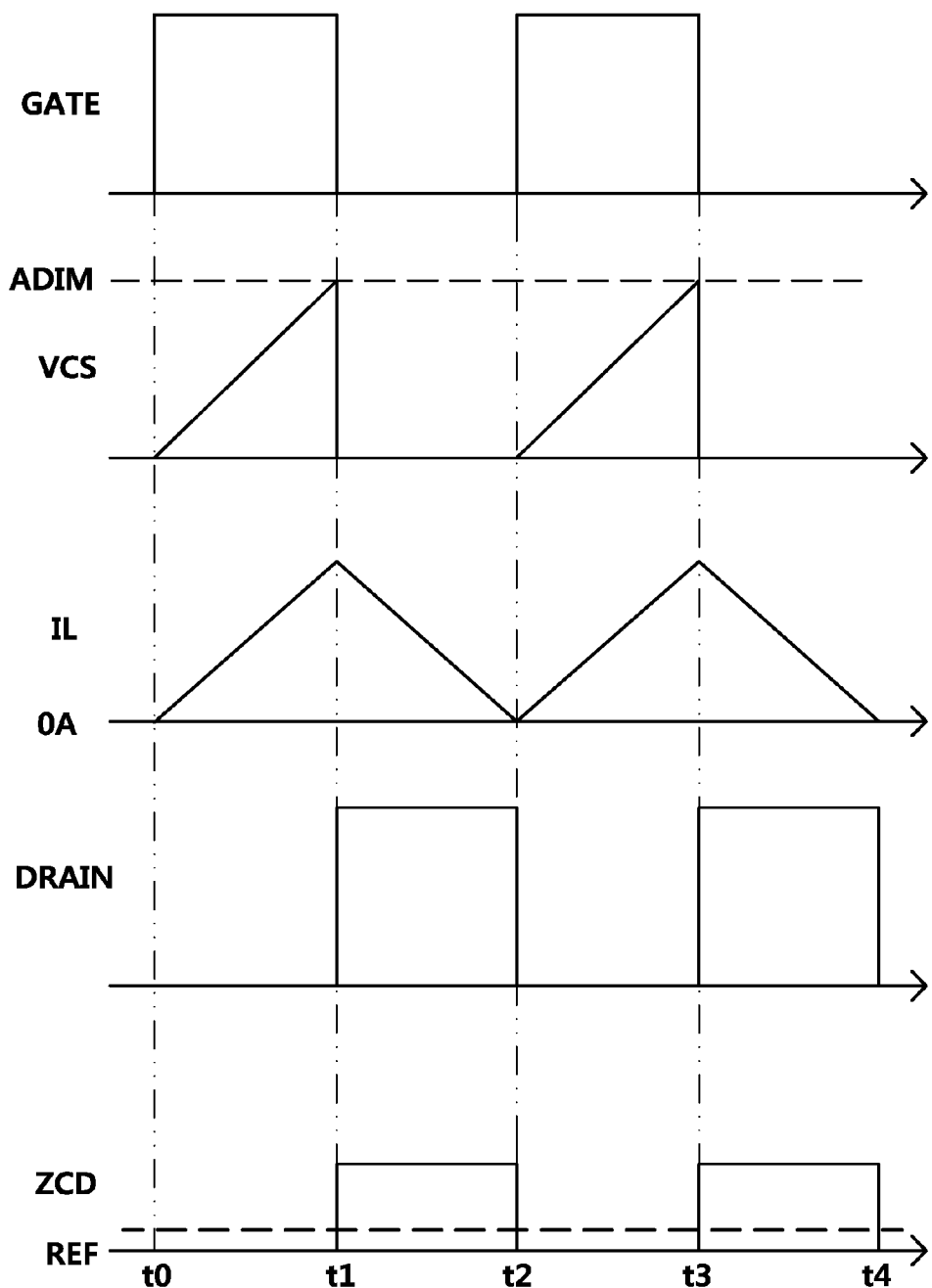
FIG. 6 illustrates an ideal operation timing diagram of FIG. 5.

The switch control circuit 300 of the examples may ideally remove a switching loss at the time when an inductor current becomes 0 A (t2), by placing a gate terminal in a high state as in the operation timing diagram of FIG. 6. However, practically, the waveform of the gate terminal GATE and the drain voltage DRAIN will have to operate with a slope. Nevertheless, the examples may remove a switching loss, and will be described with reference to FIG. 7.

Figure 7:
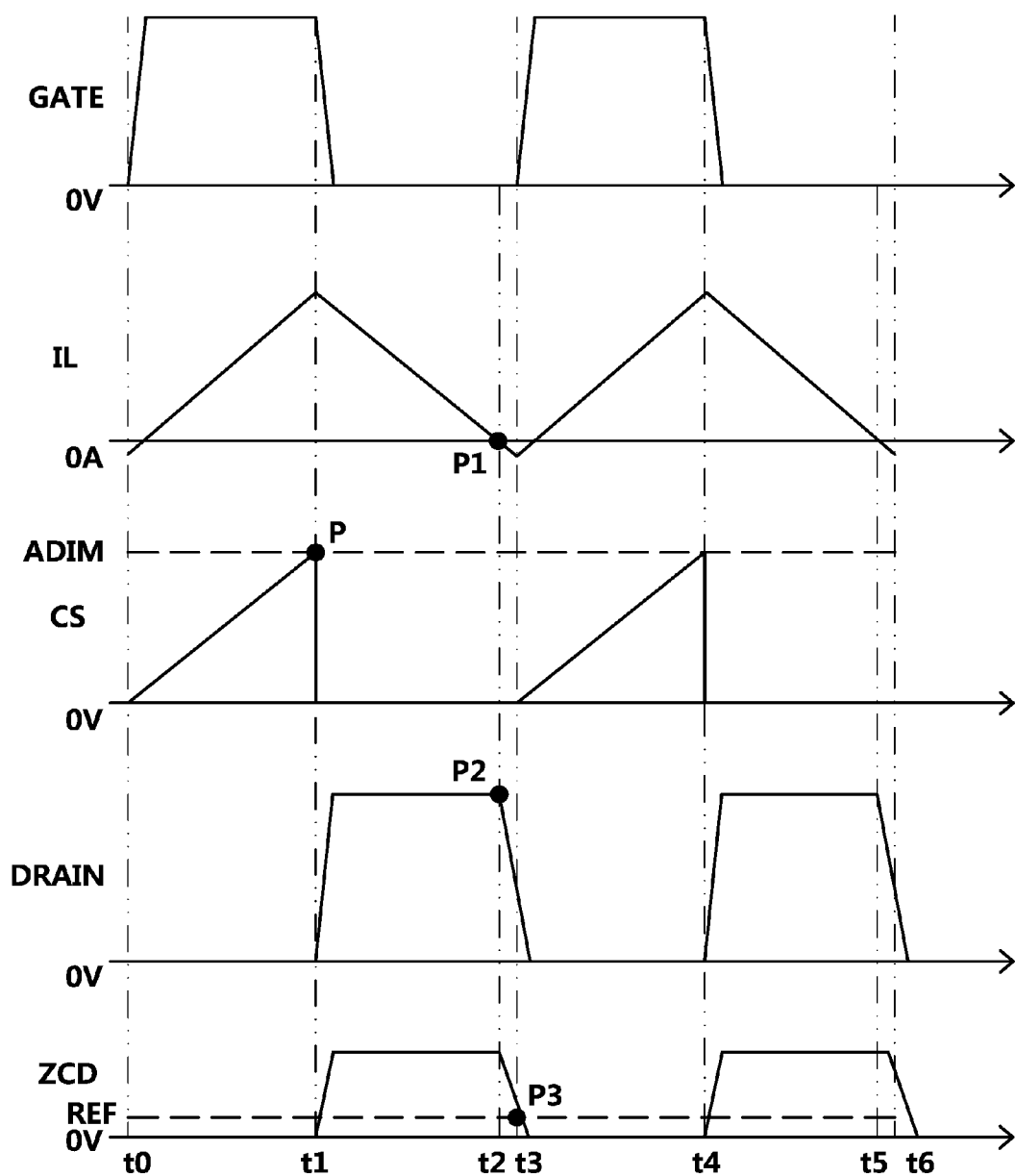
FIG. 7 illustrates an example of a practical operation timing diagram of FIG. 5.

FIG. 7 illustrates an example operation timing diagram of an example switch control circuit, in accordance with one or more embodiments.

When a gate terminal is in a high state, the first switch 110 may be configured to turn on, and an inductor current (IL) and a sensing voltage (CS) may increase (t0~t1). Then, at the point when an inductor current arrives at a certain peak (t1), in other words, at a time when a sensing voltage (CS) and a load current setting voltage (ADIM) become the same level (P), a gate terminal (GATE) is turned off (a low state). Then, the inductor current (IL) starts to decrease (t1~t2). On the other hand, when a gate terminal is turned off, the drain voltage (DRAIN) increases and becomes a high state (t1~t2) because a drain current flowing through the first switch 110 is blocked. The drain voltage remains in a high state when the gate terminal is in a low state.

After that, when an inductor current decreases and becomes 0 A (P1 of t2), the drain voltage may also start to decrease (specifically, the drain voltage may start decreasing at P2, during t2~t3). Then a voltage distributed by the first resistor 130 and the second resistor 150 is output, and when the drain voltage decreases, the drain sensing voltage (ZCD) may also decrease in a ratio of the first resistor 130 and the second resistor 150.

Moreover, when the drain sensing voltage (ZCD) falls below a predetermined reference voltage (REF) (P3), the switch operating unit 230 may output a control signal that turns on the gate terminal (a high state). Thus, the gate terminal (GATE) may be configured to perform a turn-on operation again (t3).

As described above, according to the examples, the drain voltage may start decreasing when an inductor current is 0 A. A switching loss of the first switch 110 is removed by setting the gate terminal to a high state when the drain sensing voltage that detects the decrease of the drain voltage falls below a predetermined reference voltage.

According to the switch control circuit and switch control method described herein, additional resistors and switch are added in as elements to sense the drain voltage, and when an inductor current is 0 A in accordance with a sensing operation, after comparing the drain sensing voltage with a predetermined reference voltage, the gate terminal may be controlled to be in a high state. Thus, a switching loss depending on a control switch operation may be preventable.

According to the disclosure, current consumption may be reduced when a switch control circuit is not operated, and a switching operation may be available over a certain frequency.

While this disclosure includes specific examples, it will be apparent after an understanding of the disclosure of this application that various varies in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switch control circuit, comprising:
a load, an inductor, a first switch, and a sensing resistor connected in series with an input power source terminal;
a sensing circuit, comprising a first resistor, a second switch, and a second resistor connected in series between a drain terminal of the first switch and a ground terminal, wherein the sensing circuit is configured to sense when current flowing through the inductor is equal to 0 A (Zero ampere);
a first comparator, configured to compare a sensing voltage with a load current setting voltage;
a second comparator, configured to compare a drain sensing voltage with a predetermined reference voltage; and
a switch operating unit, configured to control the first switch based on an output signal of the first comparator and an output signal of the second comparator,
wherein the second comparator is configured to apply the output signal of the second comparator to the switch operating unit to turn on the first switch when the drain sensing voltage is less than the predetermined reference voltage,
the drain sensing voltage senses a drain voltage of the first switch between the second switch and the second resistor of the sensing circuit, and
the second switch is configured to turn off to prevent current consumption when the switch control circuit is not being operated.

2. The switch control circuit of claim 1, wherein the sensing voltage is a voltage across both sides of the sensing resistor.

3. The switch control circuit of claim 1,
wherein the first switch and the second switch are each implemented as a metal-oxide-semiconductor field-effect-transistor (MOSFET).

4. The switch control circuit of claim 1, further configured to be implemented as a Quasi Resonant Buck Converter.

5. The switch control circuit of claim 1, wherein the second switch is further configured to prevent a drain voltage of the first switch from increasing over a predetermined voltage.

6. The switch control circuit of claim 1, wherein the second switch is further configured to prevent current from the input power source terminal from flowing to the first resistor and the second resistor through the load when the switch control circuit is not being operated.

7. A Quasi-Resonant Mode Buck Converter switch control method of a switch control circuit, comprising;
sensing a decrease of an inductor current when a gate terminal of a first switch is in a low state using a sensing circuit comprising a first resistor, a second switch, and a second resistor connected in series between a drain terminal of the first switch and a ground terminal;
comparing a drain sensing voltage of the first switch with a predetermined reference voltage when the inductor current has a value of 0 A; and
outputting a control signal to place the gate terminal in a high state when the drain sensing voltage is less than the predetermined reference voltage,
wherein the second switch is configured to prevent current from the input power source terminal from flowing to the first resistor and the second resistor through a load when the switch control circuit is not being operated.

8. The method of claim 7,
wherein the gate terminal is in a low state when a sensing voltage across both sides of a sensing resistor and a load current setting voltage are equal.

9. A power supply device, comprising:
a switch control circuit; and
a load, an inductor, and a first switch, each connected in series with an input power source terminal,
wherein the switch control circuit comprises:
a sensing circuit comprising a first resistor, a second switch, and a second resistor connected to a drain terminal of the first switch, and configured to sense a drain voltage of the first switch; and
a controller, configured to determine a turn-on timing of the first switch based on a drain sensing voltage detected by the sensing circuit,
wherein the second switch is configured to prevent current from the input power source terminal from flowing to the first resistor and the second resistor through the load when the switch control circuit is not being operated.

10. The device of claim 9,
wherein the sensing of the drain voltage of the first switch is performed between the second switch and the second resistor of the sensing circuit.

11. The device of claim 10,
wherein the switch control circuit further comprises a second comparator configured to output a signal to determine a turn-on timing of the first switch by comparing the drain sensing voltage with a predetermined reference voltage.

12. The device of claim 11, further comprising a switch operating unit, configured to control a turn-on operation or a turn-off operation of the first switch, based on an output signal of the first comparator or the output signal of the second comparator.

13. The device of claim 11,
wherein the second comparator is configured to apply the output signal to a switch operating unit to turn on the first switch when the drain sensing voltage, which decreases when an inductor current is 0 A, is less than the predetermined reference voltage.

14. The device of claim 9,
wherein a first side of a sensing resistor is connected in series with a source terminal of the first switch, and a second side of the sensing resistor is connected to a ground terminal.

15. The device of claim 14,
wherein the controller is configured to determine a turn-off timing of the first switch based on a sensing voltage between the source terminal of the first switch and the sensing resistor.

16. The device of claim 15,
wherein the switch control circuit further comprises a first comparator, configured to output a signal to determine a turn-off timing of the first switch by comparing the sensing voltage of the source terminal of the first switch with a load current setting voltage.

17. The device of claim 9,
wherein the first switch and the second switch are each implemented as a metal-oxide-semiconductor field-effect-transistor (MOSFET).

* * * * *